United States Patent
Lai et al.

(10) Patent No.: US 8,699,224 B2
(45) Date of Patent: Apr. 15, 2014

(54) COMPUTER PERIPHERAL DEVICE FOR BEING FIXED ON A CASING OF A PORTABLE COMPUTER

(75) Inventors: Yen-Chang Lai, New Taipei (TW); Jia-Hung Lee, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 168 days.

(21) Appl. No.: 13/456,229

(22) Filed: Apr. 26, 2012

(65) Prior Publication Data

US 2012/0275103 A1    Nov. 1, 2012

(30) Foreign Application Priority Data

Apr. 26, 2011   (TW) .............................. 100114397 A

(51) Int. Cl.
- G06F 1/16 (2006.01)
- G06G 5/00 (2006.01)
- G06F 3/033 (2013.01)

(52) U.S. Cl.
USPC .............. 361/679.58; 361/679.1; 361/679.18; 345/156; 345/157; 345/163

(58) Field of Classification Search
USPC ............. 361/679.01–679.45, 679.55–679.59; 312/223.1, 223.2; 345/156, 157, 168, 345/169, 905, 163
See application file for complete search history.

(56) References Cited

U.S. PATENT DOCUMENTS

| | | | | |
|---|---|---|---|---|
| 5,615,083 A | * | 3/1997 | Burnett | 361/679.1 |
| 5,793,355 A | * | 8/1998 | Youens | 345/157 |
| 6,163,326 A | * | 12/2000 | Klein et al. | 345/156 |
| 6,292,358 B1 | * | 9/2001 | Lee et al. | 361/679.23 |
| 6,784,870 B2 | * | 8/2004 | Yin | 345/156 |
| 7,486,279 B2 | * | 2/2009 | Wong et al. | 345/173 |
| 7,554,523 B2 | * | 6/2009 | Chang et al. | 345/156 |
| 7,554,800 B2 | * | 6/2009 | Bragg | 361/679.58 |
| 8,251,523 B2 | * | 8/2012 | Lau | 353/119 |
| 2011/0216496 A1 | * | 9/2011 | Benbrahim | 361/679.31 |

FOREIGN PATENT DOCUMENTS

TW          M281228       11/2005

* cited by examiner

*Primary Examiner* — Jayprakash N Gandhi
*Assistant Examiner* — Nidhi Desai
(74) *Attorney, Agent, or Firm* — Winston Hsu; Scott Margo

(57) ABSTRACT

The present disclosure relates to a computer peripheral device. The computer peripheral device includes a housing whereon an opening is formed, and a fixing module installed inside the opening in a reversible manner. The fixing module includes a base installed inside the opening, a locking head passing through the locking plate and fixed on the base at one end. The locking head includes a latching part for inserting into a slot on a casing of a portable computer when the base turns to a first position relative to the housing so that the latching part protrudes outside the housing. When the locking plate is pressed down so as to separate the latching part from the locking plate and the locking head rotates relative to the locking plate, the latching part cannot separate from the slot. The fixing module further includes a resilient component for pushing the locking plate.

18 Claims, 17 Drawing Sheets

COMPUTER PERIPHERAL DEVICE FOR BEING FIXED ON A CASING OF A PORTABLE COMPUTER

BACKGROUND OF THE INVENTION

1. Field of the Invention

The present disclosure relates to a computer peripheral device, and more particularly, to a computer peripheral device for being fixed on a casing of a portable computer.

2. Description of the Prior Art

In general, a conventional notebook computer emphasizes portability as its product advantage. It still needs a user to carry a computer peripheral device, such as a mouse and so on, and such a manner reduces the portability for the notebook computer. Although notebook manufacturing industry has developed a touch pad as an input interface, most users are used to operating the mouse resulting in that the mouse is still a must for the most users. Thus, a containing space for the mouse and the cable thereof takes into consideration when carrying the mouse. As a result, it causes quite inconvenience. For solving above drawbacks, mechanism for containing the mouse comes up. For example, an additional buckle for fixing the computer peripheral device or mechanism for containing the computer peripheral device inside the notebook computer is utilized. A notebook computer with a containing slot being formed on its top surface is disclosed in Taiwan Patent Publication No. M281228 for containing a multi-function mouse. Such kind of design solves issue of carrying the mouse, but the containing slot is a recess so as to affect aesthetic feeling of the notebook computer when taking the mouse out of the containing slot for using. Further, whether the mouse can be firmly fixed inside the containing slot and the additional mechanical space for containing the mouse are issues for the above-mentioned mechanism. The computer peripheral device has important issues on containing mechanism designed basing on original mechanism of the notebook computer.

SUMMARY OF THE INVENTION

The present disclosure provides a computer peripheral device for being fixed on a casing of a portable computer for solving above drawbacks.

According to the claimed disclosure, a computer peripheral device for being fixed on a casing of a portable computer includes a housing whereon an opening is formed and a fixing module installed inside the opening in a reversible manner. The fixing module includes a base installed inside the opening in a manner capable of rotating around an axis and of being reversible relative to the housing, a locking plate installed inside the base in a movable manner relative to the axis, and a locking head passing through the locking plate and fixed on the base at one end. The locking head includes a latching part for inserting into a slot on the casing of the portable computer when the base turns to a first position relative to the housing so that the latching part protrudes outside the housing. The latching part is incapable of separating from the slot when the locking plate is pressed down so as to separate the latching part from the locking plate and the locking head rotates relative to the locking plate. The fixing mechanism further includes a resilient component installed inside the base for pushing the locking plate to move along the axis.

According to the claimed disclosure, an opening slot connected to the opening is formed on the housing, a containing part is formed on an inner wall of the housing, and the base includes a pin for passing through the opening slot and for being fixed inside the containing part when the base is rotated in a specific stroke relative to the housing.

According to the claimed disclosure, the containing part includes a protrusion and a first recess, and the pin is fixed inside the first recess and is stopped by the protrusion.

According to the claimed disclosure, a guiding slot is formed on an inner wall of the housing, and the base includes a guiding component installed in the guiding slot in a slidable manner for guiding the base to rotate around the axis.

According to the claimed disclosure, a sliding slot and a stopper are formed on an inner wall of the base, the locking plate comprises a positioning component installed inside the sliding slot in a slidable manner, and the stopper stops the positioning component.

According to the claimed disclosure, a second recess is formed on the locking plate, a constraining protrusion is formed on the latching part, and the resilient component is used for pushing the locking plate so as to engage the constraining protrusion with the second recess.

According to the claimed disclosure, a third recess is formed on the end of the locking head, and the base comprises a hook for engaging with the third recess.

According to the claimed disclosure, the computer peripheral device further includes a skidproof cushion installed on a side of the base and sheathed on the locking head and the locking plate, and the skidproof cushion contacts the casing of the portable computer when the latching part is inserted into the slot.

According to the claimed disclosure, the base is substantially aligned with the housing when the base is rotated to a second position relative to the housing.

According to the claimed disclosure, a fixing module for fixing a computer peripheral device on a casing of a portable computer includes a base installed inside an opening on a housing in a manner capable of rotating around an axis and of being reversible relative to the housing, a locking plate installed inside the base in a movable manner relative to the axis, and a locking head passing through the locking plate and fixed on the base at one end. The locking head includes a latching part for inserting into a slot on the casing of the portable computer when the base turns to a first position relative to the housing so that the latching part protrudes outside the housing. The latching part is incapable of separating from the slot when the locking plate is pressed down so as to separate the latching part from the locking plate and the locking head rotates relative to the locking plate. The fixing module further includes a resilient component installed inside the base for pushing the locking plate to move along the axis.

In summary, the computer peripheral device of the present disclosure utilizes structural interference by rotation between the latching part and the slot (e.g. an existing lock slot of the portable computer) of the portable computer to fix the computer peripheral device onto the casing of the portable computer. Accordingly, it neither needs an additional component for fixing the computer peripheral device, nor an additional containing space for containing the computer peripheral device. As a result, the computer peripheral device of the present disclosure provides a mechanism with easy assembly and convenience in containing.

These and other objectives of the present disclosure will no doubt become obvious to those of ordinary skill in the art after reading the following detailed description of the embodiment that is illustrated in the various figures and drawings.

DETAILED DESCRIPTION

Figure 1:
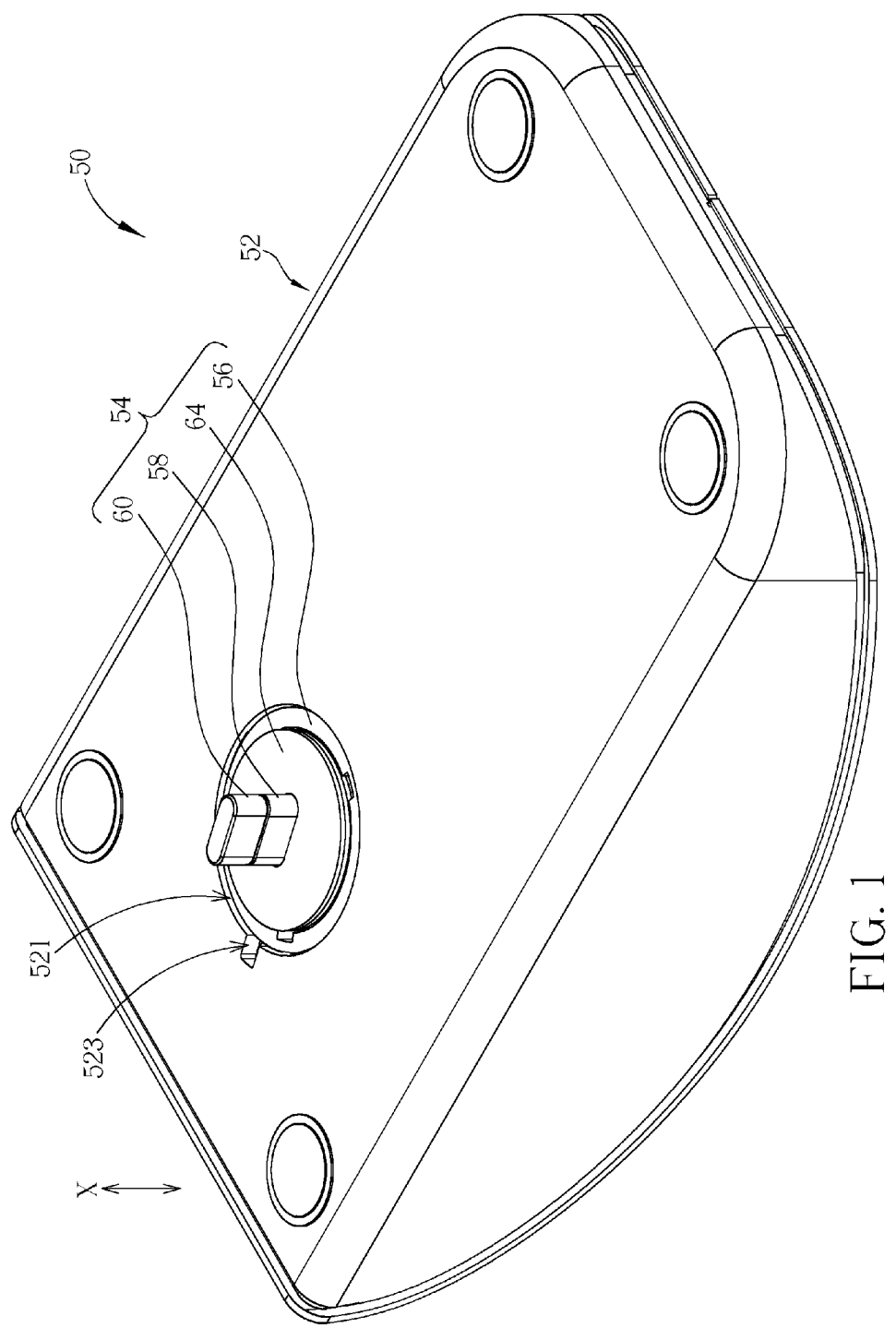
FIG. 1 to FIG. 3 are respectively diagrams of a computer peripheral device in different states according to an embodiment of the present disclosure.
Figure 2:
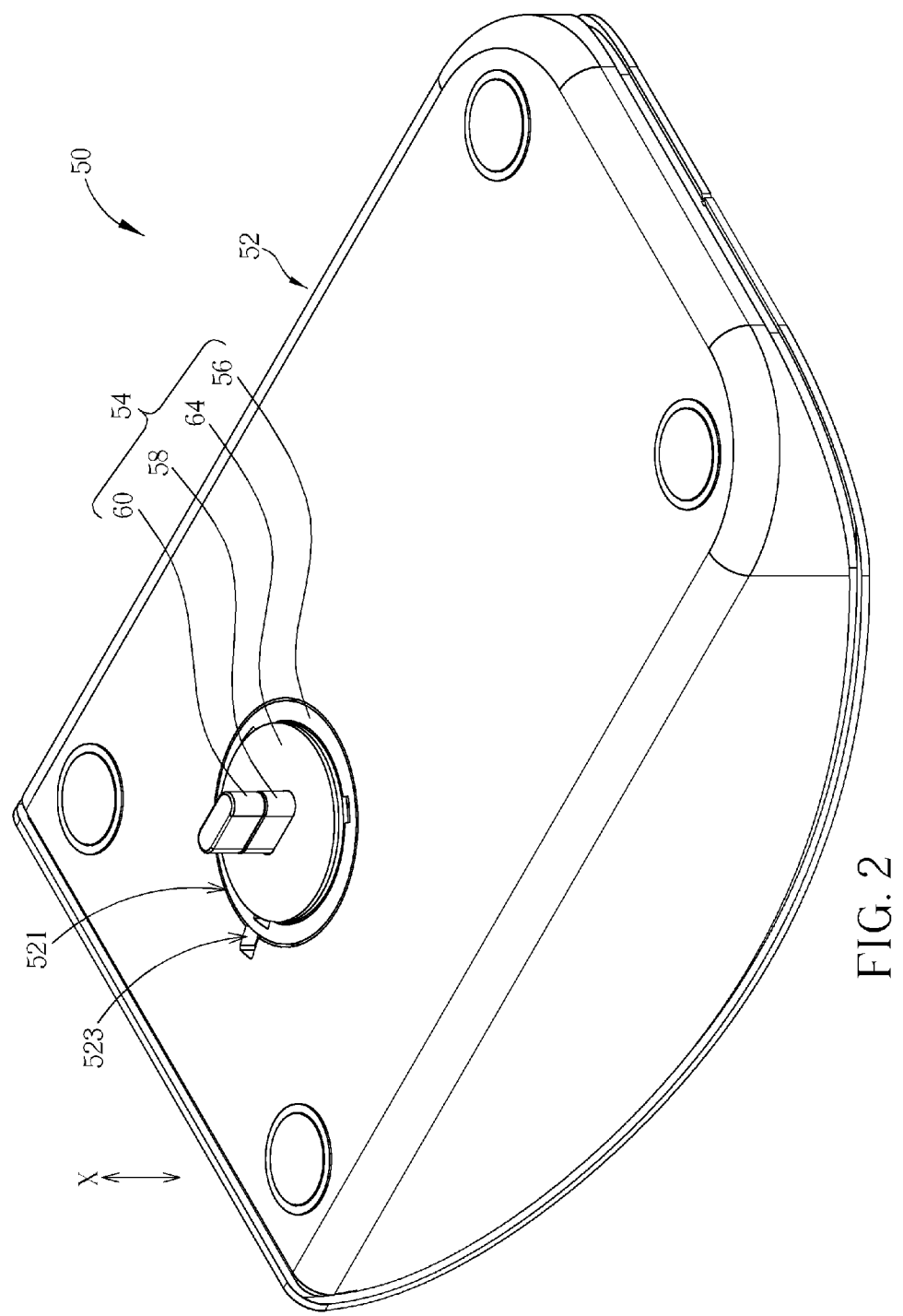
Figure 3:
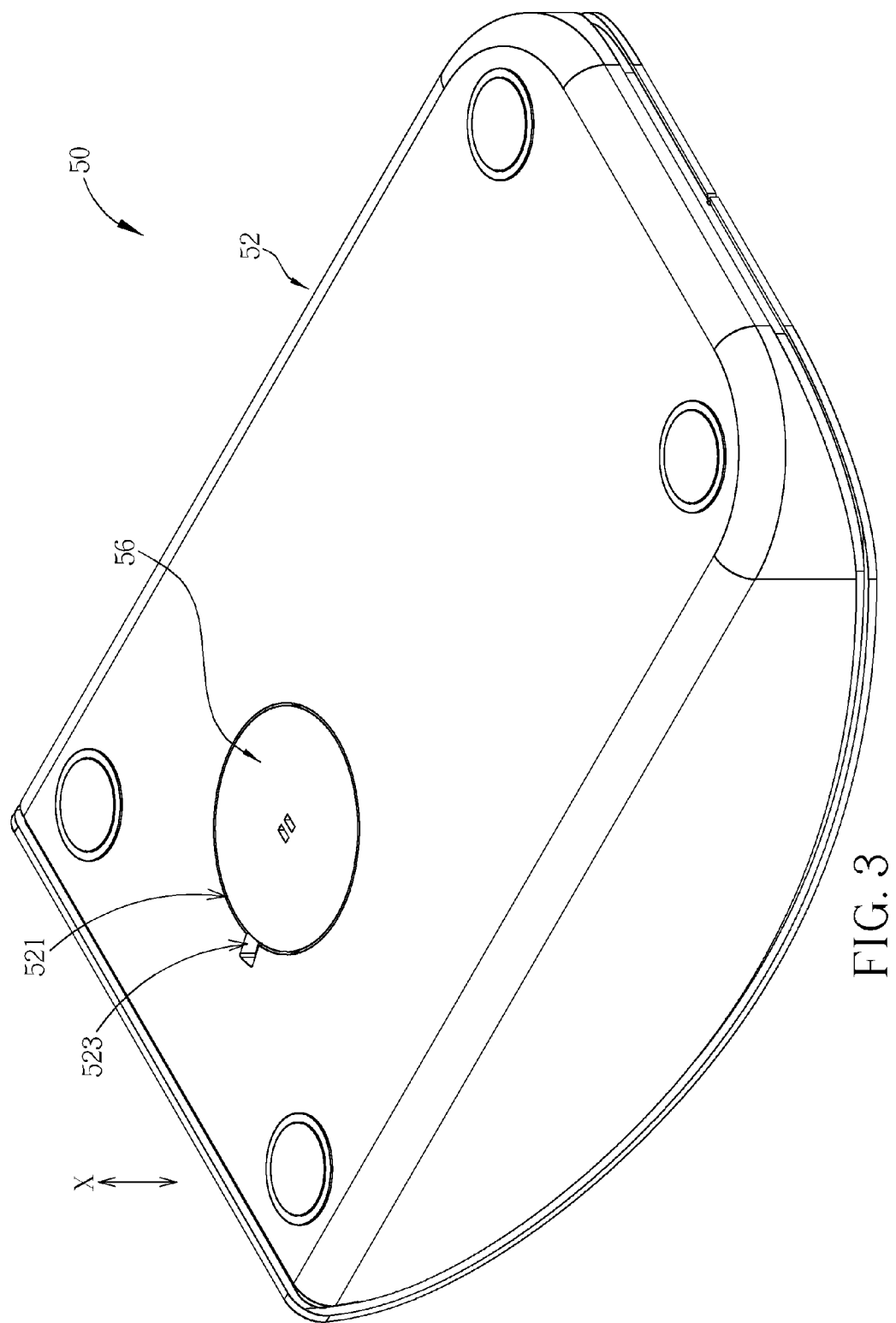
Figure 4:
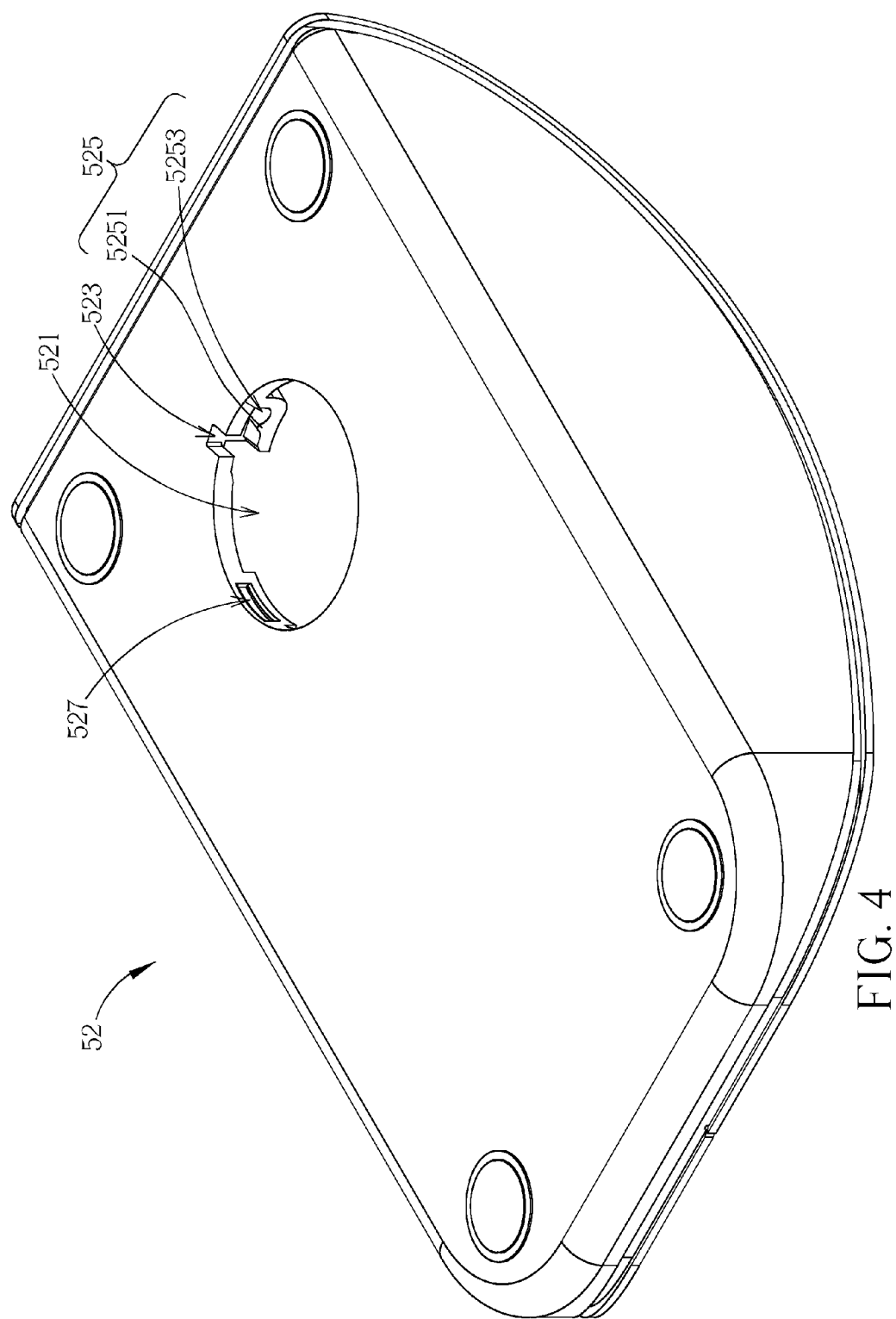
FIG. 4 is a diagram of a housing according to the embodiment of the present disclosure.
Figure 5:
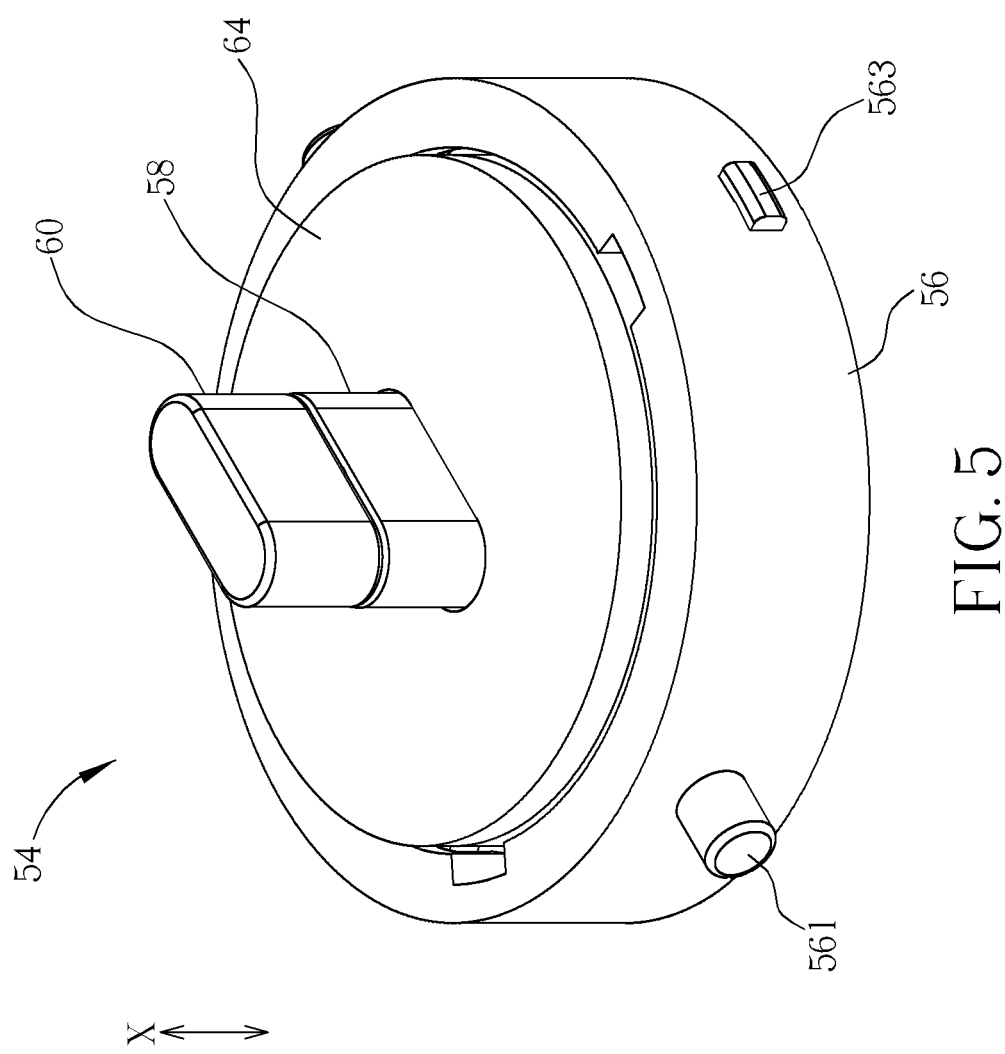
FIG. 5 is a diagram of a fixing module according to the embodiment of the present disclosure.
Figure 6:
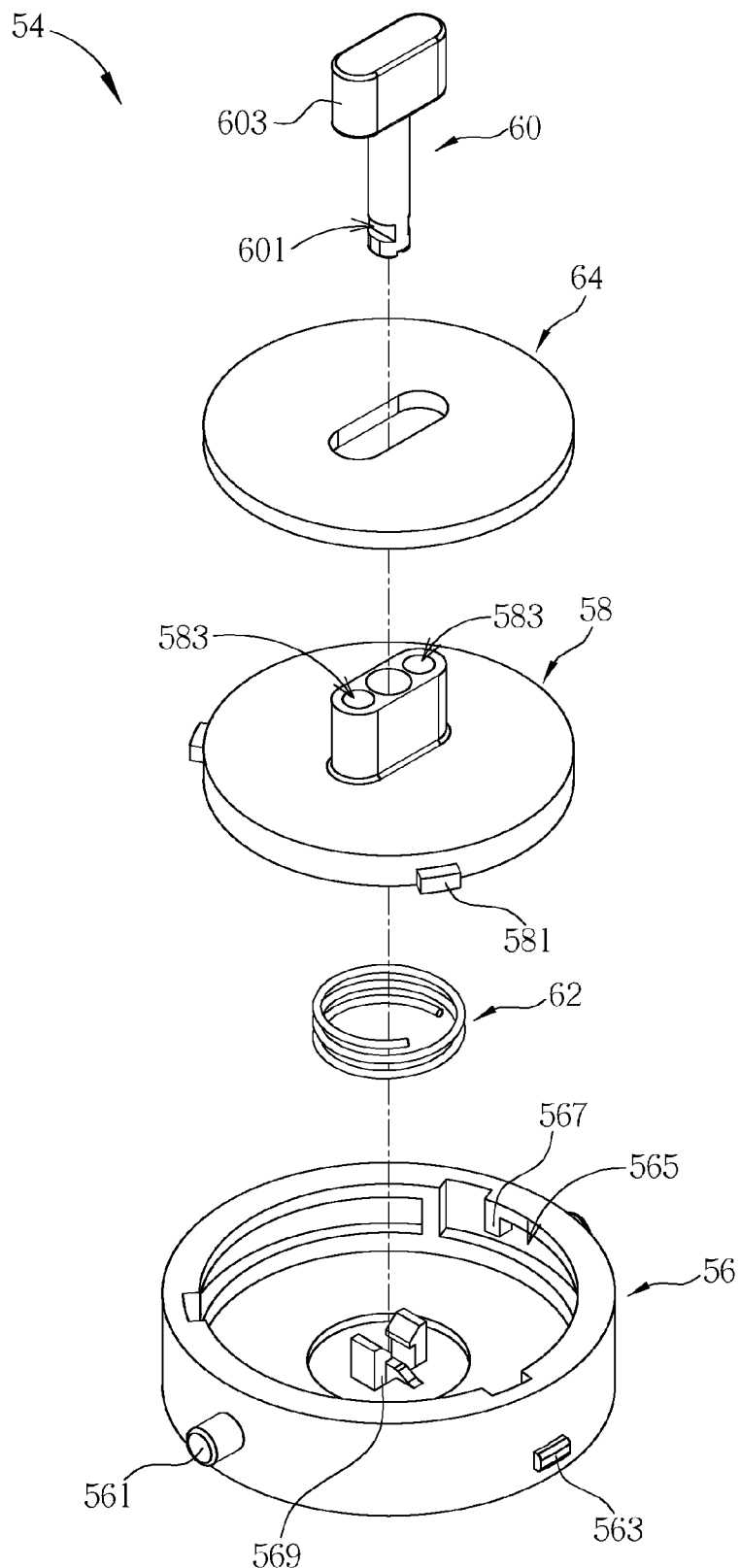
FIG. 6 is an exploded diagram of the fixing module according to the embodiment of the present disclosure.
Figure 7:
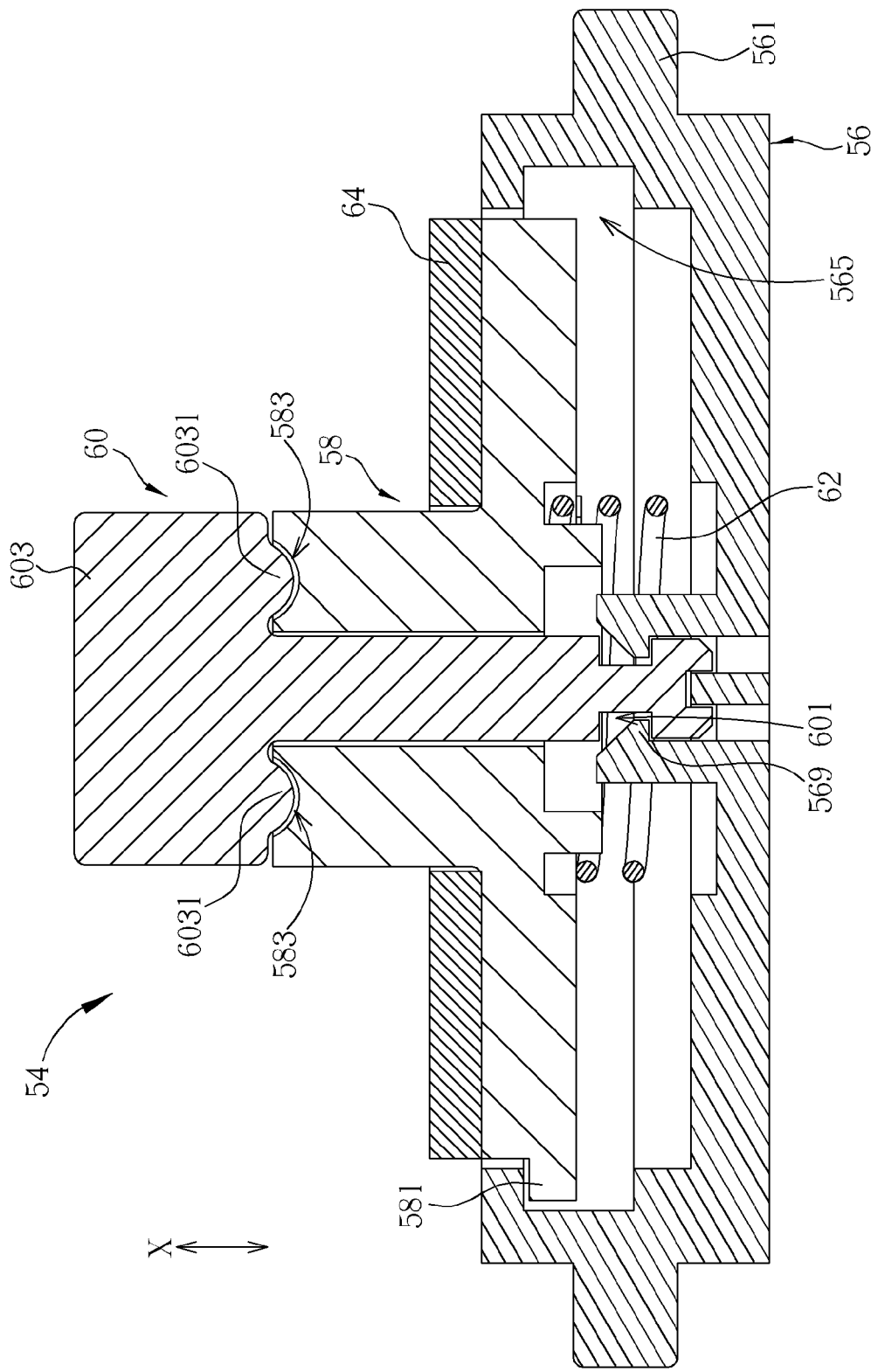
FIG. 7 is a sectional diagram of the fixing module according to the embodiment of the present disclosure.

Please refer to FIG. 1 to FIG. 3. FIG. 1 to FIG. 3 are respectively diagrams of a computer peripheral device 50 in different states according to an embodiment of the present disclosure. The computer peripheral device 50 can be a mouse or other external devices connected to a computer. In this embodiment, the computer peripheral device 50 is a mouse device. The computer peripheral device 50 includes a housing 52 whereon an opening 521 and an opening slot 523 connected to the opening 521 are formed. The computer peripheral device 50 further includes a fixing module 54 installed inside the opening 521 on the housing 52 in a reversible manner. Please refer to FIG. 1 to FIG. 7. FIG. 4 is a diagram of the housing 52 according to the embodiment of the present disclosure. FIG. 5 is a diagram of the fixing module 54 according to the embodiment of the present disclosure. FIG. 6 is an exploded diagram of the fixing module 54 according to the embodiment of the present disclosure. FIG. 7 is a sectional diagram of the fixing module 54 according to the embodiment of the present disclosure. At least one containing part 525 is formed on an inner wall of the housing 52, and the containing part 525 includes a protrusion 5251 and a first recess 5253. At least one guiding slot 527 is formed on an inner wall of the housing 52. The fixing module 54 includes a base 56 installed inside the opening 521 in a manner capable of rotating around an axis (an X-axis) and of being reversible relative to the housing 52. The base 56 includes at least one pin 561 and a guiding component 563, and a sliding slot 565 and a stopper 567 are formed on an inner wall of the base 56. The pin 561 is used for passing through the opening slot 523 and for being fixed inside the containing part 525 after the base 56 is rotated in a specific stroke (e.g. from a position in FIG. 1 to a position in FIG. 2) relative to the housing 52. In other words, the pin 561 is fixed inside the first recess 5253 and stopped by the protrusion 5251, and the guiding component 563 is installed in the guiding slot 527 in a slidable manner for guiding the base 56 to rotate around the axis (the X-axis).

The fixing module 54 further includes a locking plate 58 installed inside the base 56 in a movable manner relative to the axis (X-axis). The locking plate 58 includes a positioning component 581 installed inside the sliding slot 565 on the base 56 in a slidable manner, and the stopper 567 on the base 56 stops the positioning component 581. In addition, at least one second recess 583 is formed on the locking plate 58. The fixing module 54 further includes a locking head 60 passing through the locking plate 58 and fixed on the base 56 at one end. For example, at least one third recess 601 is formed on the end of the locking head 60, and the base 56 includes at least one hook 569 for engaging with the third recess 601 on the locking head 60 so as to fix the locking head 60 on the base 56. A latching part 603 is disposed on another end of the locking head 60, and at least one constraining protrusion 6031 is formed on the latching part 603. The constraining protrusion 6031 is disposed at a position corresponding to the second recess 583 for engaging in the second recess 583. The fixing module 54 further includes a resilient component 62 which can be a spring. The resilient component 62 is installed inside the base 56 for pushing the locking plate 58 to move along the axis (X-axis), so that the constraining protrusion 6031 on the locking head 60 is firmly engaged in the second recess 583. The fixing module 54 further includes a skidproof cushion 64 installed on a side of the base 56 and sheathed on the locking head 60 and the locking plate 58. The skidproof cushion 64 is used for providing friction when the computer peripheral device 50 contacts other objects.

Figure 8:
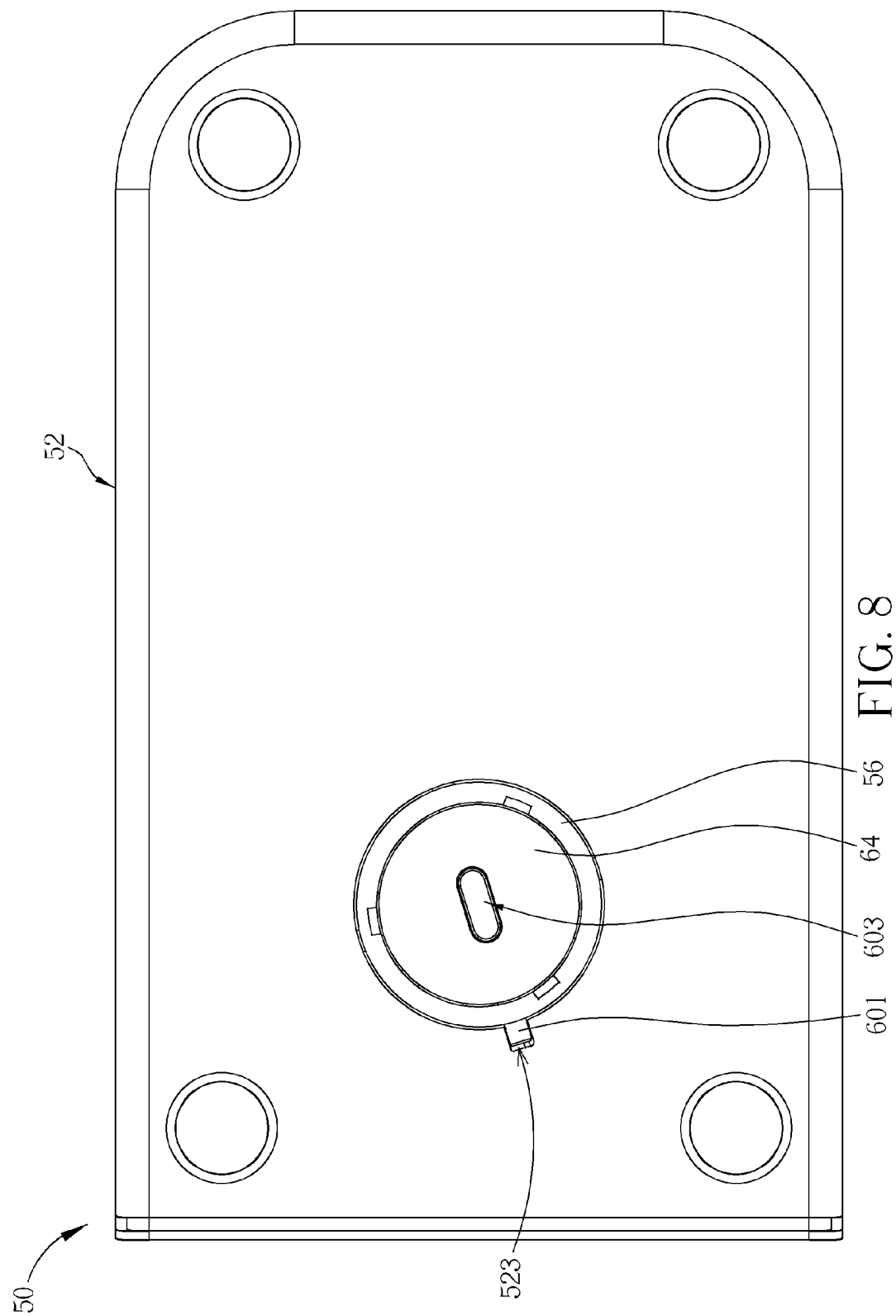
FIG. 8 to FIG. 10 are respectively bottom views of the computer peripheral device in different states according to the embodiment of the present disclosure.
Figure 9:
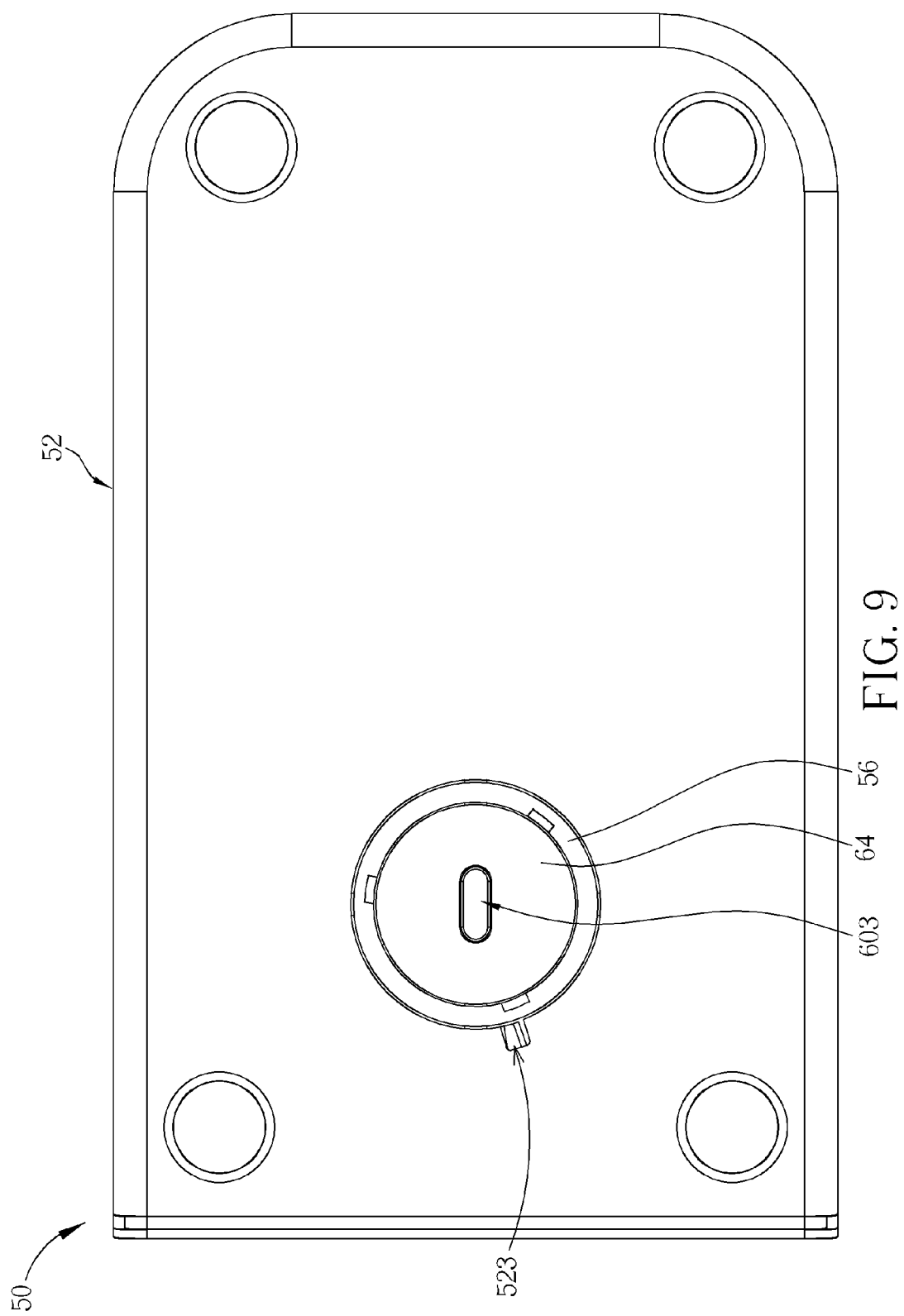
Figure 10:
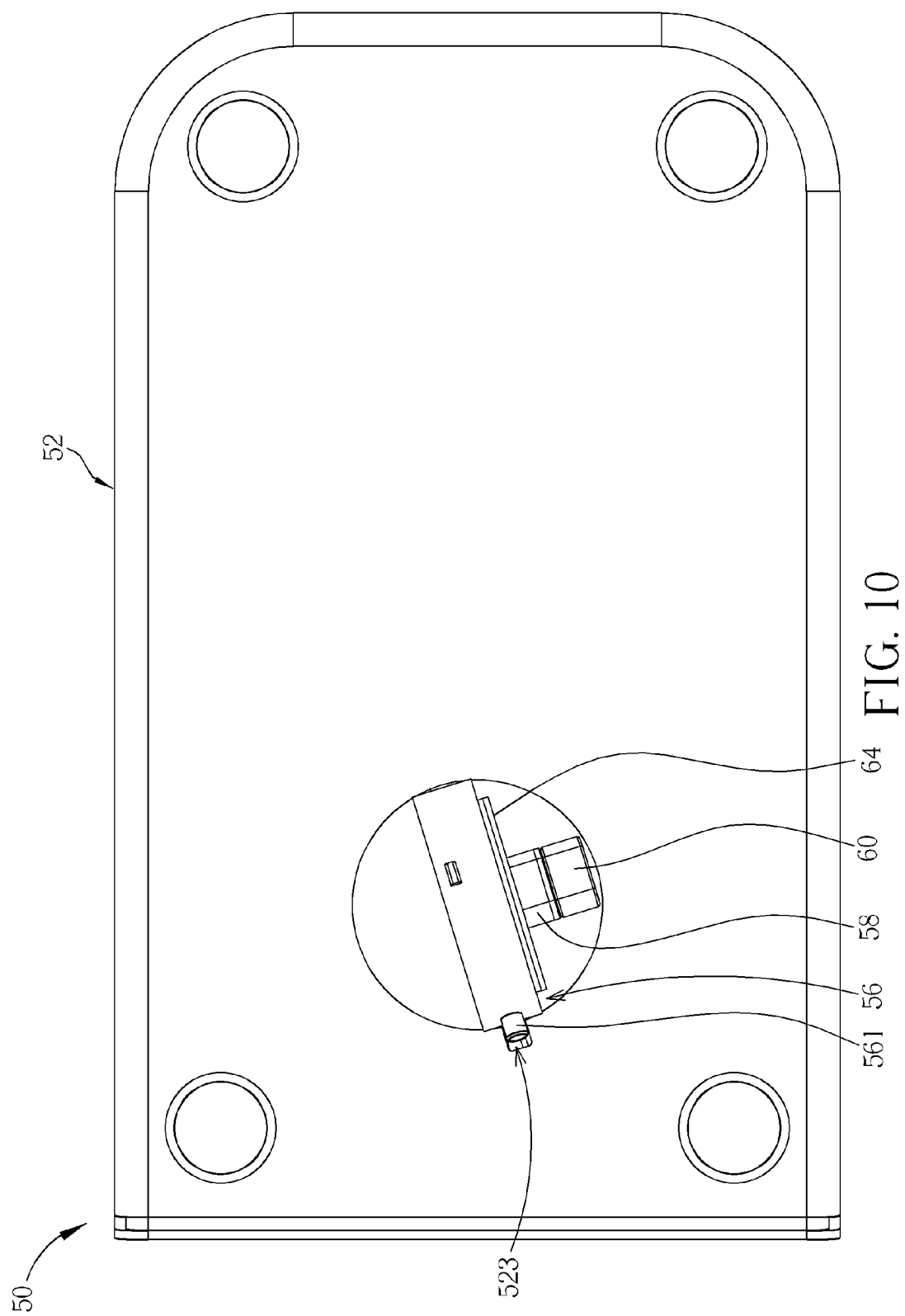

Please refer to FIG. 8 to FIG. 10. FIG. 8 to FIG. 10 are respectively bottom views of the computer peripheral device 50 in different states according to the embodiment of the present disclosure. As shown in FIG. 1, FIG. 2, FIG. 8 and FIG. 9, the base 56 turns to a first position relative to the housing 52. At the same time, the latching part 603 of the locking head 60 protrudes outside the housing 52. As shown in FIG. 1, the pin 561 of the base 56 can pass through the opening slot 523 on the housing 52. The base 56 can rotate around the axis (X-axis) from the position shown in FIG. 1 and FIG. 8 to a position shown in FIG. 2 and FIG. 9, so that the pin 561 can be fixed in the containing part 525. At the same time, the base 56 is fixed inside the housing 52 without separating from the housing 52. When the fixing module 54 turns from a position shown in FIG. 10 to a position shown in FIG. 3, the base 56 turns to a second position relative to the housing 52, wherein the first position can differ from the second position by substantially 180 degrees. When the base 56 turns to the second position relative to the housing 52, the latching part 603 of the locking head 60 can be hidden inside the housing 52. At the same time, the base 56 can be substantially aligned with the housing 52 for the convenient operation of the computer peripheral device 50, such as sliding smoothly without suffering any interference for the mouse.

Figure 11:
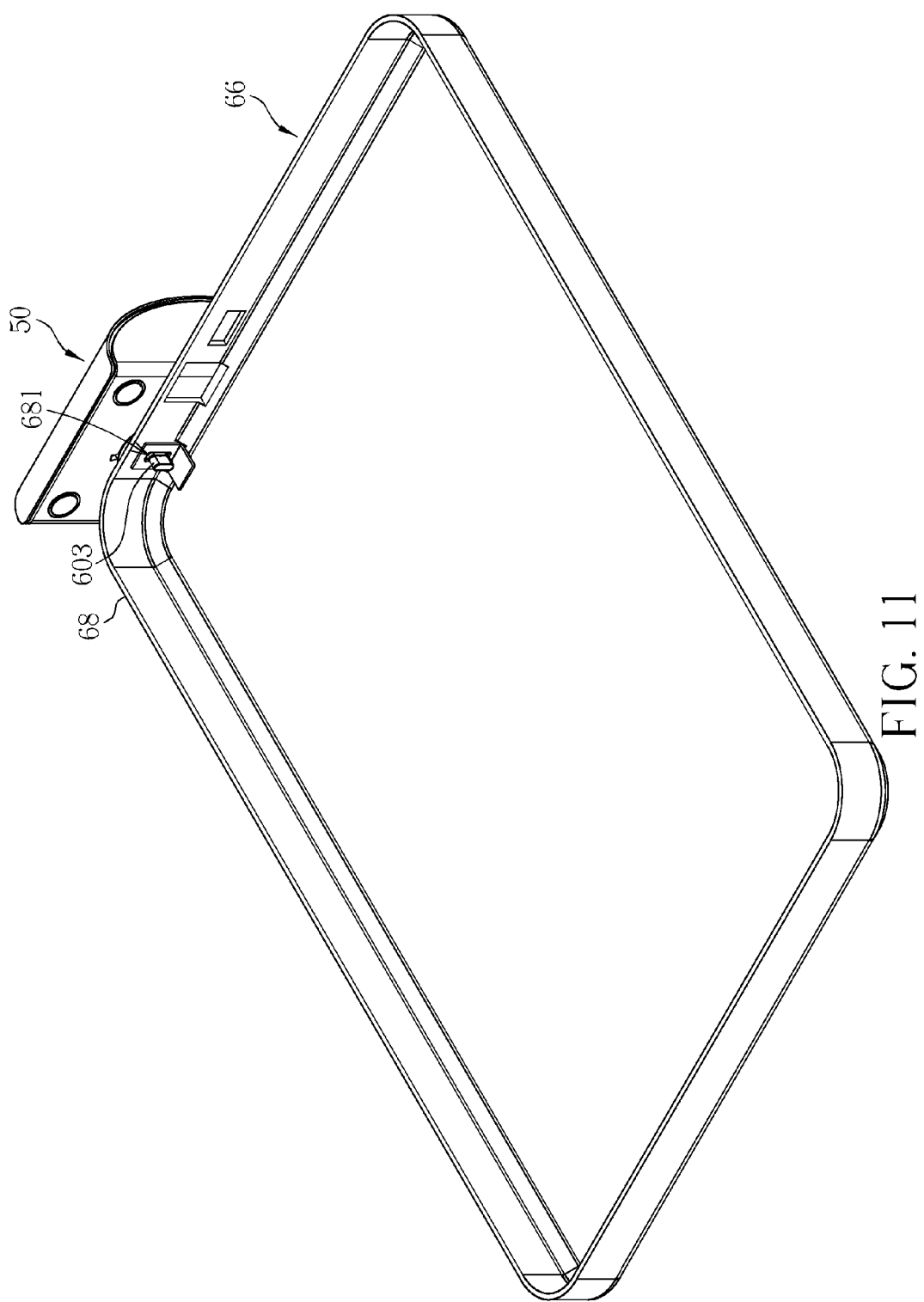
FIG. 11 to FIG. 13 are respectively assembly diagrams illustrating that the computer peripheral device is fixed on a casing of a portable computer according to the embodiment of the present disclosure.
Figure 12:
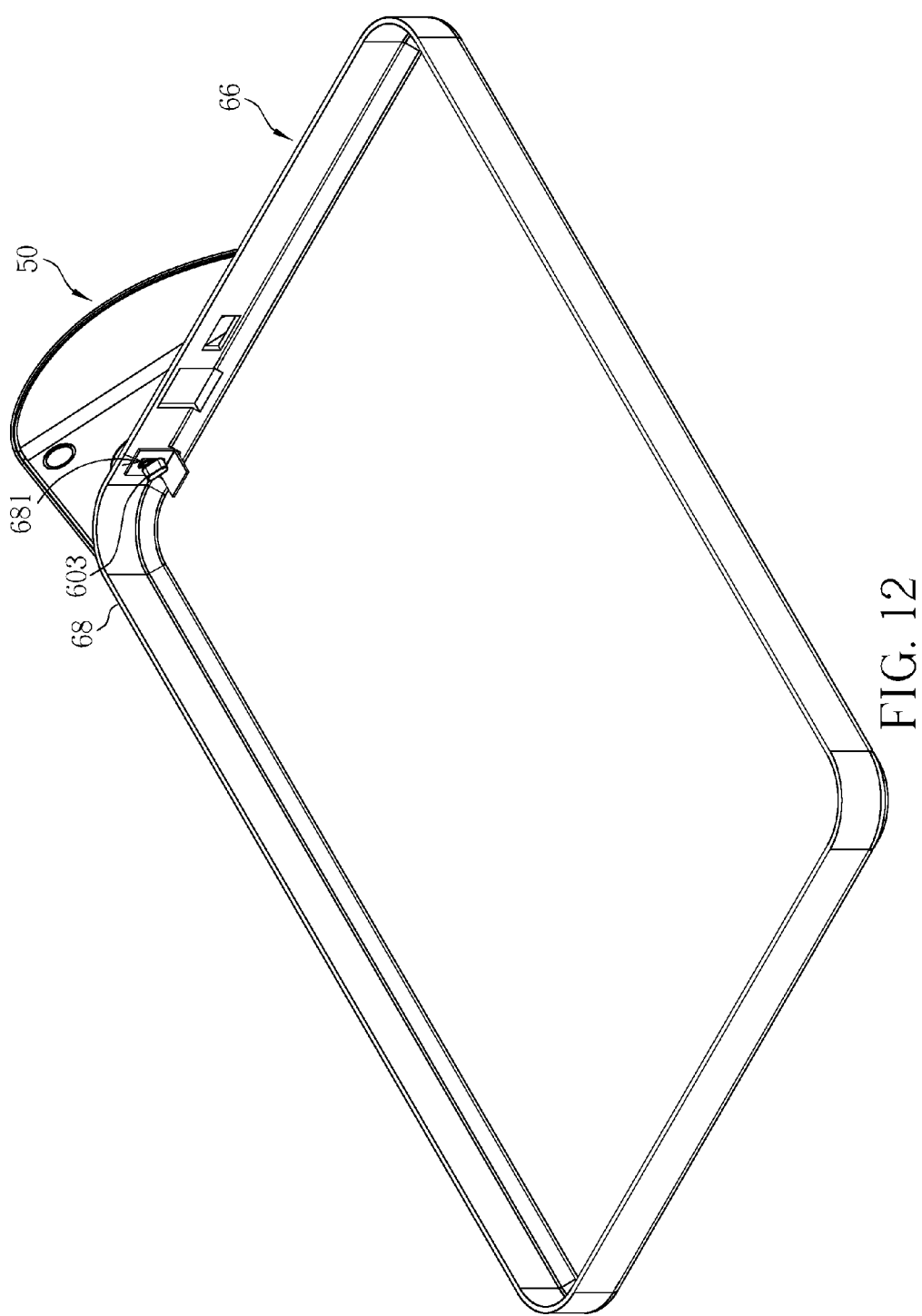
Figure 13:
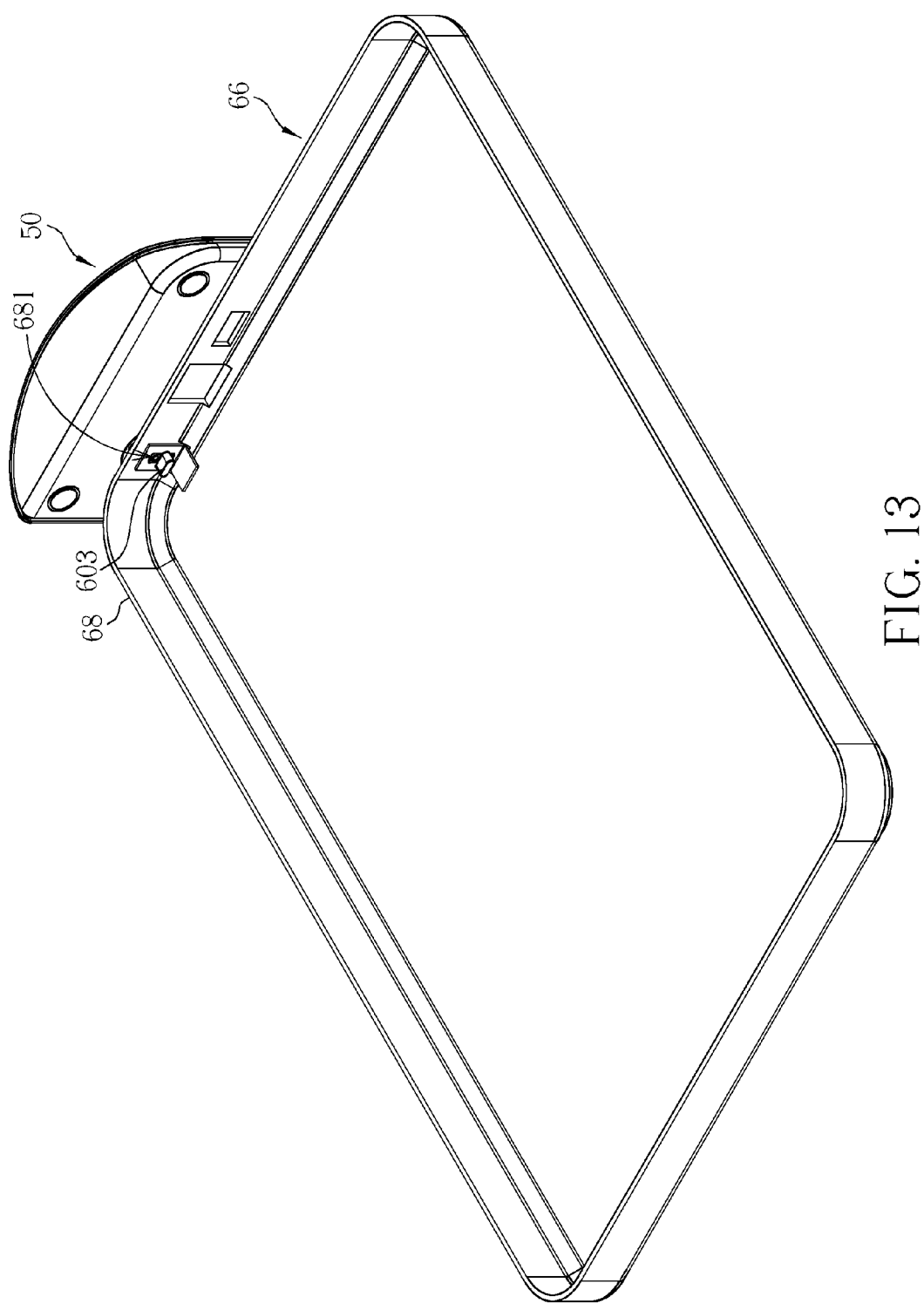

Please refer to FIG. 11 to FIG. 13. FIG. 11 to FIG. 13 are respectively assembly diagrams illustrating that the computer peripheral device 50 is fixed on a casing 68 of a portable computer 66 according to the embodiment of the present disclosure. When the computer peripheral device 50 is not in use, the computer peripheral device 50 can be fixed on the casing 68 of the portable computer 66 so that the computer peripheral device 50 can be carried with the portable computer 66 at the same time. First, the base 56 can be turned to the first position relative to the housing 52, and the base 56 is rotated to the position as shown in FIG. 2 and FIG. 9, so that the latching part 603 of the locking head 60 protrudes outside the housing 52 and the base 56 is fixed inside the housing 52 without separating from the housing 52. At the same time, the latching part 603 of the locking head 60 can be inserted into a slot 681 on the casing 68 of the portable computer 66 as shown in FIG. 11. The slot 681 can be an existing lock slot on the portable computer 66, such as a Kensington lock slot. Thus, no additional slot on the casing 68 is required.

Then, the computer peripheral device 50 can be pressed and the base 56 and the locking head 60 can be rotated relative to the locking plate 58 as shown in FIG. 12 to the position in FIG. 13. At the same time, the latching part 603 of the locking head 60 can not pass through the slot 681. The computer peripheral device 50 can be effectively fixed on the casing 68 of the portable computer 66 by interference between the latching part 603 and the slot 681. The position of the latching part 603 of the locking head 60 shown in FIG. 11 can differ from that in FIG. 13 by substantially 90 degrees. In other words, the locking head 60 of the base 56 rotates 90 degrees relative to the locking plate 58. The rotation angle is not limited to those mentioned above, as long as an angle capable of generating interference between the latching part 603 and the slot 681 is within the scope of the present disclosure. In addition, the skidproof cushion 64 can contact the casing 68 of the portable computer 66 when the latching part 603 is inserted into the slot 681. In such a manner, the skidproof cushion 64 can provide friction when the computer peripheral device 50 is fixed on the casing 68 of the portable computer 66, so as to prevent the computer peripheral device 50 from sliding relative to the casing 68 of the portable computer 66.

Figure 14:
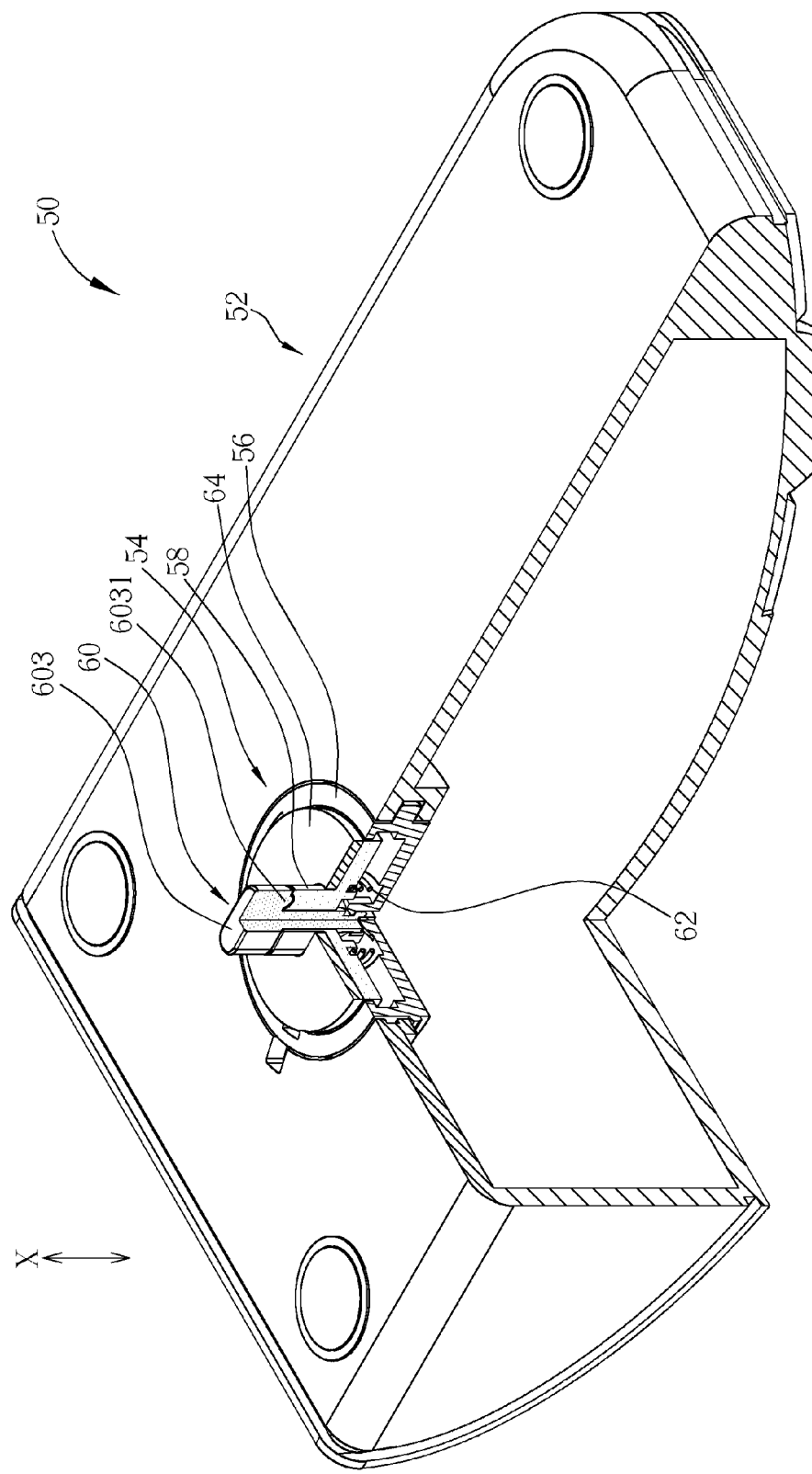
FIG. 14 to FIG. 17 are respectively sectional diagrams of the computer peripheral device in different states according to the embodiment of the present disclosure.
Figure 15:
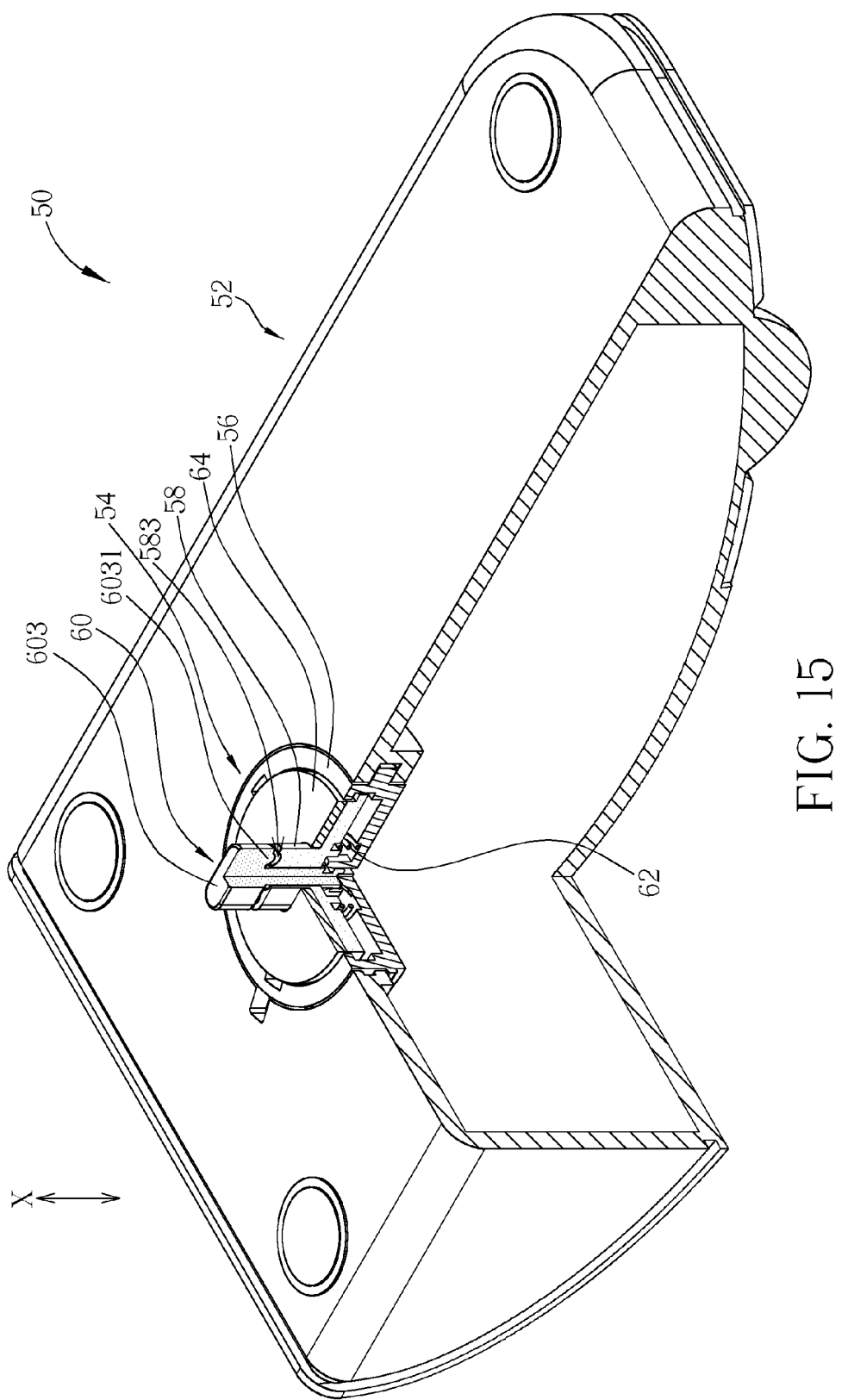
Figure 16:
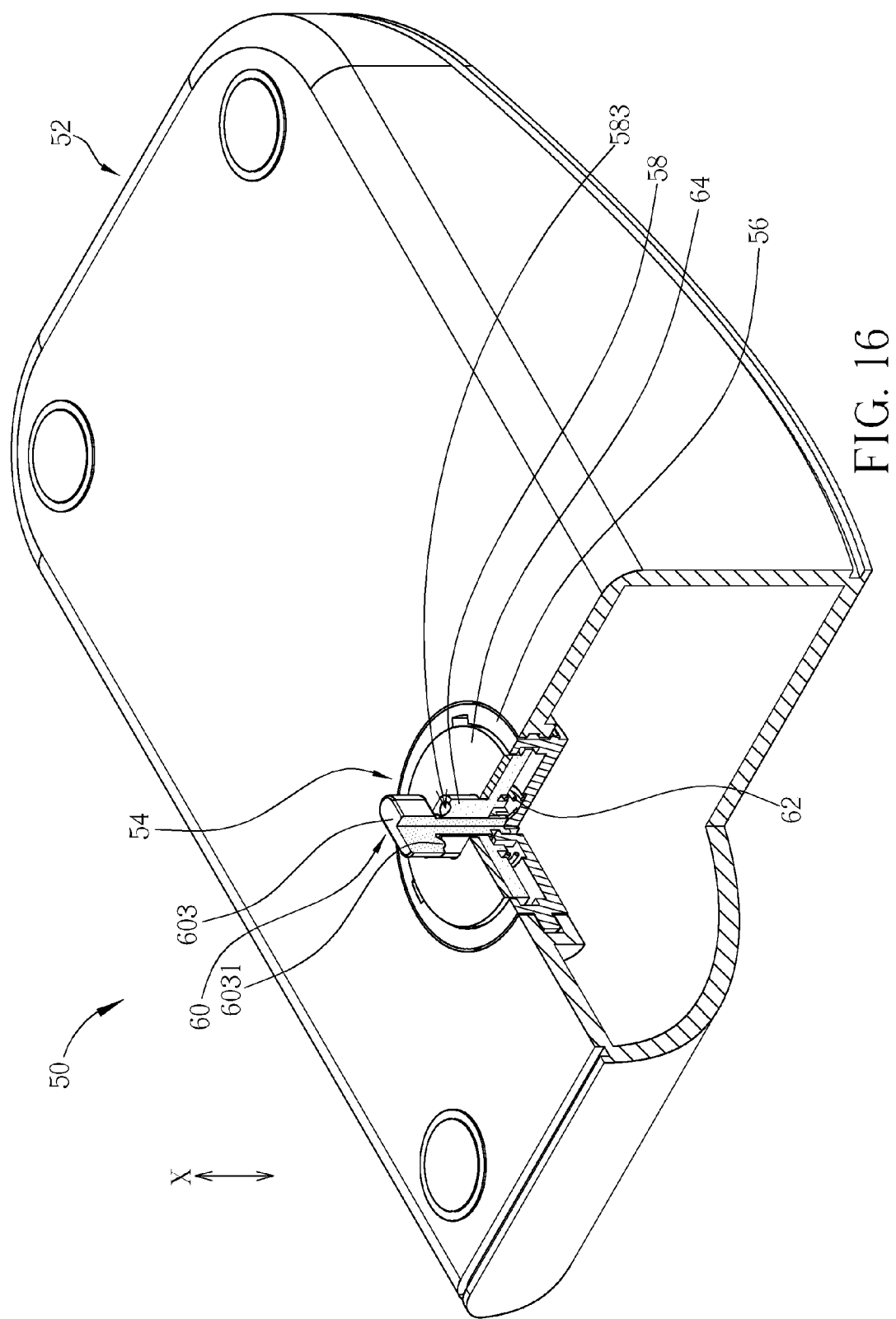
Figure 17:
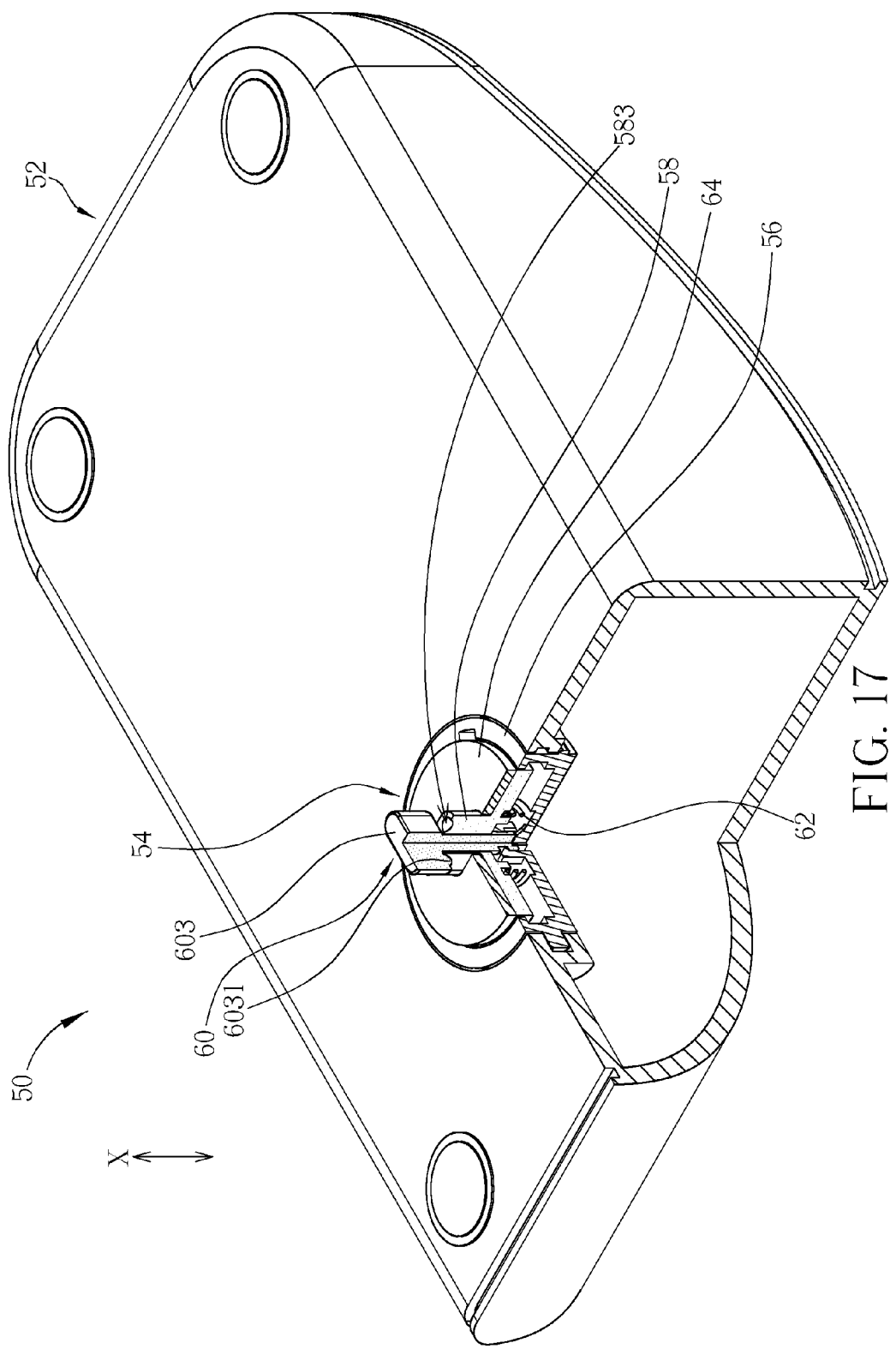

Please refer to FIG. 14 to FIG. 17. FIG. 14 to FIG. 17 are respectively sectional diagrams of the computer peripheral device 50 in different states according to the embodiment of the present disclosure. When the computer peripheral device 50 is not pressed as shown in FIG. 14, the resilient component 62 pushes the locking plate 58, so that the constraining protrusion 6031 of the locking head 60 is firmly engaged in the second recess 583 on the locking plate 58. At the same time, the locking head 60 cannot rotate relative to the locking plate 58. When the computer peripheral device 50 is pressed as shown in FIG. 15, for example, the computer peripheral device 50 is pressed in the state shown in FIG. 11, the skidproof cushion 64 and the locking plate 58 are pushed inward to the housing 52, so as to compress the resilient component 62. The constraining protrusion 6031 of the locking head 60 can separate from the second recess 583 on the locking plate 58. At the same time, the housing 52 can be rotated to drive the base 56 and the locking head 60 to rotate synchronously. In other words, the base 56 and the locking head 60 are rotated from the position in FIG. 15 to a position in FIG. 16. Then the computer peripheral device 50 is released, and the compressed resilient component 62 can provide the locking plate 58 with a resilient force, as shown in FIG. 17. The constraining protrusion 6031 of the locking head 60 can be firmly engaged in the second recess 583 on the locking plate 58 again. Accordingly, the latching part 603 can be fixed inside the casing 68 of the portable computer 66 due to the interference between the latching part 603 and the slot 681.

Compared with the prior art, the computer peripheral device of the present disclosure utilizes structural interference by rotation between the latching part and the slot (e.g. an existing lock slot of the portable computer) of the portable computer to fix the computer peripheral device onto the casing of the portable computer. Accordingly, it neither needs an additional component for fixing the computer peripheral device, nor an additional containing space for containing the computer peripheral device. As a result, the computer peripheral device of the present disclosure provides a mechanism with easy assembly and convenience in containing.

Those skilled in the art will readily observe that numerous modifications and alterations of the device and method may be made while retaining the teachings of the disclosure.

What is claimed is:

1. A computer peripheral device for being fixed on a casing of a portable computer, comprising:
    a housing whereon an opening is formed; and
    a fixing module installed inside the opening in a reversible manner, comprising:
        a base installed inside the opening in a manner capable of rotating around an axis and of being reversible relative to the housing;
        a locking plate installed inside the base in a movable manner relative to the axis;
        a locking head passing through the locking plate and fixed on the base at one end, the locking head comprising a latching part for inserting into a slot on the casing of the portable computer when the base turns to a first position relative to the housing so that the latching part protrudes outside the housing, the latching part being incapable of separating from the slot when the locking plate is pressed down so as to separate the latching part from the locking plate and the locking head rotates relative to the locking plate; and
        a resilient component installed inside the base for pushing the locking plate to move along the axis.

2. The computer peripheral device of claim 1, wherein an opening slot connected to the opening is formed on the housing, a containing part is formed on an inner wall of the housing, the base comprises a pin for passing through the opening slot and for being fixed inside the containing part when the base is rotated in a specific stroke relative to the housing.

3. The computer peripheral device of claim 2, wherein the containing part comprises a protrusion and a first recess, and the pin is fixed inside the first recess and is stopped by the protrusion.

4. The computer peripheral device of claim 1, wherein a guiding slot is formed on an inner wall of the housing, and the base comprises a guiding component installed in the guiding slot in a slidable manner for guiding the base to rotate around the axis.

5. The computer peripheral device of claim 1, wherein a sliding slot and a stopper are formed on an inner wall of the base, the locking plate comprises a positioning component installed inside the sliding slot in a slidable manner, and the stopper stops the positioning component.

6. The computer peripheral device of claim 1, wherein a second recess is formed on the locking plate, a constraining protrusion is formed on the latching part, and the resilient component is used for pushing the locking plate so as to engage the constraining protrusion with the second recess.

7. The computer peripheral device of claim 1, wherein a third recess is formed on the end of the locking head, and the base comprises a hook for engaging with the third recess.

8. The computer peripheral device of claim 1, further comprising a skidproof cushion installed on a side of the base and sheathed on the locking head and the locking plate, and the skidproof cushion contacts the casing of the portable computer when the latching part is inserted into the slot.

9. The computer peripheral device of claim 1, wherein the base is substantially aligned with the housing when the base is rotated to a second position relative to the housing.

10. A fixing module for fixing a computer peripheral device on a casing of a portable computer, comprising:
    a base installed inside an opening on a housing in a manner capable of rotating around an axis and of being reversible relative to the housing;
    a locking plate installed inside the base in a movable manner relative to the axis;
    a locking head passing through the locking plate and fixed on the base at one end, the locking head comprising a latching part for inserting into a slot on the casing of the portable computer when the base turns to a first position relative to the housing so that the latching part protrudes outside the housing, the latching part being incapable of separating from the slot when the locking plate is pressed down so as to separate the latching part from the locking plate and the locking head rotates relative to the locking plate; and a resilient component installed inside the base for pushing the locking plate to move along the axis.

11. The fixing module of claim 10, wherein an opening slot connected to the opening is formed on the housing, a containing part is formed on an inner wall of the housing, the base comprises a pin for passing through the opening slot and for being fixed inside the containing part when the base is rotated in a specific stroke relative to the housing.

12. The fixing module of claim 11, wherein the containing part comprises a protrusion and a first recess, and the pin is fixed inside the first recess and is stopped by the protrusion.

13. The fixing module of claim 10, wherein a guiding slot is formed on an inner wall of the housing, and the base comprises a guiding component installed in the guiding slot in a slidable manner for guiding the base to rotate around the axis.

14. The fixing module of claim 10, wherein a sliding slot and a stopper are formed on an inner wall of the base, the locking plate comprises a positioning component installed inside the sliding slot in a slidable manner, and the stopper stops the positioning component.

15. The fixing module of claim 10, wherein a second recess is formed on the locking plate, a constraining protrusion is formed on the latching part, and the resilient component is used for pushing the locking plate so as to engage the constraining protrusion with the second recess.

16. The fixing module of claim 10, wherein a third recess is formed on the end of the locking head, and the base comprises a hook for engaging with the third recess.

17. The fixing module of claim 10, further comprising a skidproof cushion installed on a side of the base and sheathed on the locking head and the locking plate, and the skidproof cushion contacts the casing of the portable computer when the latching part is inserted into the slot.

18. The fixing module of claim 10, wherein the base is substantially aligned with the housing when the base is rotated to a second position relative to the housing.

* * * * *